United States Patent
Chen

(10) Patent No.: US 10,620,295 B2
(45) Date of Patent: Apr. 14, 2020

(54) POSITIONING SIGNAL RECEIVER, POSITIONING SYSTEM AND POSITIONING METHOD OF THE SAME

(71) Applicant: HTC Corporation, Taoyuan (TW)

(72) Inventor: Yuan-Tung Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 188 days.

(21) Appl. No.: 15/674,537

(22) Filed: Aug. 11, 2017

(65) Prior Publication Data

US 2018/0074158 A1    Mar. 15, 2018

Related U.S. Application Data

(60) Provisional application No. 62/394,223, filed on Sep. 14, 2016.

(51) Int. Cl.
*H04W 24/00* (2009.01)
*G01S 5/02* (2010.01)
(Continued)

(52) U.S. Cl.
CPC .......... *G01S 5/0263* (2013.01); *G01S 5/0226* (2013.01); *G01S 5/14* (2013.01); *G01S 5/30* (2013.01); *G01S 11/16* (2013.01); *G01S 5/0045* (2013.01)

(58) Field of Classification Search
None
See application file for complete search history.

(56) References Cited

U.S. PATENT DOCUMENTS

| 2007/0070812 A1* | 3/2007 | Lee ........................... G01S 5/30 367/128 |
| 2014/0192622 A1* | 7/2014 | Rowe ........................ G01S 5/28 367/117 |

(Continued)

FOREIGN PATENT DOCUMENTS

| CN | 1981206 A | 6/2007 |
| CN | 103376441 A | 10/2013 |

(Continued)

OTHER PUBLICATIONS

Corresponding Chinese office action dated Feb. 3, 2020.

*Primary Examiner* — Jinsong Hu
*Assistant Examiner* — Alexander J Yi
(74) *Attorney, Agent, or Firm* — CKC & Partners Co., LLC

(57) ABSTRACT

A positioning signal receiver that includes an electromagnetic wave receiver, a mechanical wave receiver and a processing circuit is provided. The electromagnetic wave receiver receives electromagnetic wave signals for indicating positions of positioning signal transmitters and for triggering the positioning signal transmitters to generate mechanical wave signals. The mechanical wave receiver receives the mechanical wave signals. The processing circuit is coupled to the electromagnetic wave receiver and the mechanical wave receiver and determines the positions of the positioning signal transmitters according to the first electromagnetic wave signals, determines signal transmission times of the mechanical wave signals and determines distances each between one of the positioning signal transmitters and the positioning signal receiver according to the signal transmission times. The processing circuit determines a position of the positioning signal receiver according to the (Continued)

distances and the positions of the positioning signal transmitters.

9 Claims, 3 Drawing Sheets

(51) Int. Cl.
*G01S 5/14* (2006.01)
*G01S 5/30* (2006.01)
*G01S 11/16* (2006.01)
G01S 5/00 (2006.01)

(56) References Cited

U.S. PATENT DOCUMENTS

2016/0116569 A1* 4/2016 Lim .................... G01S 5/30
367/117
2016/0202343 A1* 7/2016 Okutsu ................ G01C 21/206
342/464

FOREIGN PATENT DOCUMENTS

| CN | 105209930 A | 12/2015 |
|---|---|---|
| JP | 2012177582 A | 9/2012 |

\* cited by examiner

POSITIONING SIGNAL RECEIVER, POSITIONING SYSTEM AND POSITIONING METHOD OF THE SAME

RELATED APPLICATIONS

This application claims priority to U.S. Provisional Application Ser. No. 62/394,223, filed Sep. 14, 2016, which is herein incorporated by reference.

BACKGROUND

Field of Invention

The present disclosure relates to positioning technologies. More particularly, the present disclosure relates to a positioning signal receiver, a positioning system and positioning method of the same.

Description of Related Art

Mobile electronic units employing applications requiring information on their geographical positioning contain means for estimating their position as accurately as possible. It is necessary that these position estimations be integral and accurate for critical positioning applications. A critical positioning application denotes an application in which estimations of position must have a high degree of reliability. Some approaches make use of the transmission of sound signals or ultrasound signals to perform positioning. However, the slow speed of the transmission of the sound signals or ultrasound signals results in insufficient accuracy.

Accordingly, a positioning signal receiver, a positioning system and positioning method of the same are needed to address the above issues.

SUMMARY

An aspect of the present disclosure is to provide a positioning signal receiver. The positioning signal receiver includes an electromagnetic wave receiver, a mechanical wave receiver and a processing circuit. The electromagnetic wave receiver is configured to receive first electromagnetic wave signals for indicating positions of a plurality of positioning signal transmitters and second electromagnetic wave signals for triggering the positioning signal transmitters to generate mechanical wave signals. The mechanical wave receiver is configured to receive the mechanical wave signals from the positioning signal transmitters. The processing circuit is coupled to the electromagnetic wave receiver and the mechanical wave receiver and is configured to determine the positions of the positioning signal transmitters according to the first electromagnetic wave signals, determine signal transmission times of the mechanical wave signals according to arrival times of the second electromagnetic wave signals and the mechanical wave signals, and determine distances each between one of the positioning signal transmitters and the positioning signal receiver according to the signal transmission times. The processing circuit determines a position of the positioning signal receiver according to the distances and the positions of the positioning signal transmitters.

Another aspect of the present disclosure is to provide a positioning system. The positioning system includes a plurality of positioning signal transmitters, a synchronizing module and a positioning signal receiver. The positioning signal transmitters are configured to generate mechanical wave signals. The synchronizing module is configured to generate first electromagnetic wave signals for indicating positions of the positioning signal transmitters and second electromagnetic wave signals for triggering the positioning signal transmitters to generate the mechanical wave signals. The positioning signal receiver includes an electromagnetic wave receiver, a mechanical wave receiver and a processing circuit. The electromagnetic wave receiver is configured to receive the first and the second electromagnetic wave signals from the synchronizing module. The mechanical wave receiver is configured to receive the mechanical wave signals from the positioning signal transmitters. The processing circuit is coupled to the electromagnetic wave receiver and the mechanical wave receiver and is configured to determine the positions of the positioning signal transmitters according to the first electromagnetic wave signals, determine signal transmission times of the mechanical wave signals according to arrival times of the second electromagnetic wave signals and the mechanical wave signals, and determine distances each between one of the positioning signal transmitters and the positioning signal receiver according to the signal transmission times. The processing circuit determines a position of the positioning signal receiver according to the distances and the positions of the positioning signal transmitters.

Yet another aspect of the present disclosure is to provide a positioning method used in a positioning signal receiver. The positioning method includes the steps outlined below. First electromagnetic wave signals for indicating positions of a plurality of positioning signal transmitters and second electromagnetic wave signals for triggering the positioning signal transmitters to generate mechanical wave signals are received by an electromagnetic wave receiver. The mechanical wave signals are received from the positioning signal transmitters by a mechanical wave receiver. The positions of the positioning signal transmitters are determined according to the first electromagnetic wave signals by a processing circuit. Signal transmission times of the mechanical wave signals are determined according to arrival times of the second electromagnetic wave signals and the mechanical wave signals by the processing circuit of the positioning signal receiver. Distances each between one of the positioning signal transmitters and the positioning signal receiver are determined according to the signal transmission times by the processing circuit. A position of the positioning signal receiver is determined according to the distances and the positions of the positioning signal transmitters by the processing circuit.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
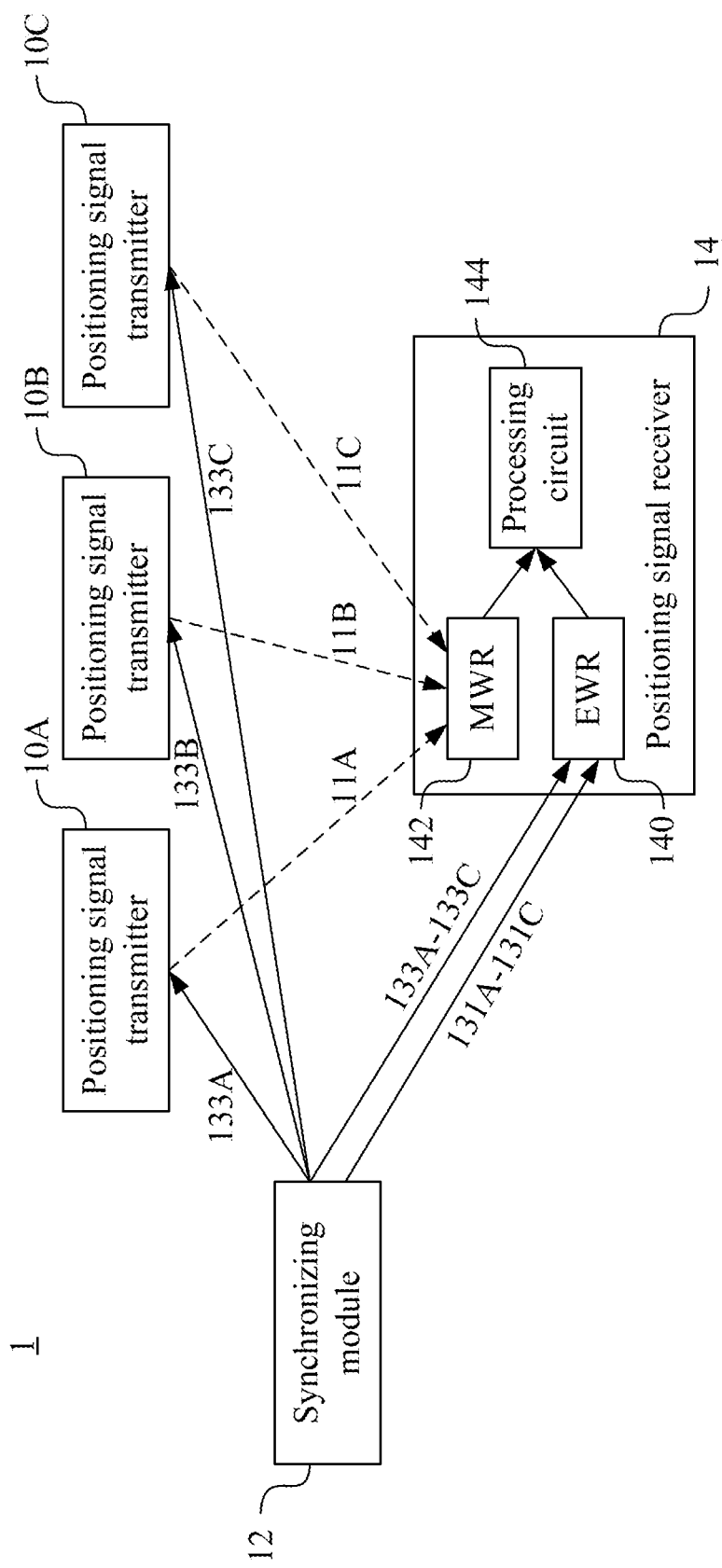
FIG. 1 is a block diagram of a positioning system in an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a block diagram of a positioning system 1 in an embodiment of the present disclosure. The positioning system 1 includes a plurality of positioning signal transmitters 10A, 10B and 100, a synchronizing module 12 and a positioning signal receiver 14.

In an embodiment, the positioning system 1 may be disposed in such as, but not limited to a room. The positioning signal transmitters 10A, 10B and 100 may be disposed on such as, but not limited to the ceiling of the room. In an embodiment, the locations of the positioning signal transmitters 10A, 10B and 10C are fixed.

The positioning signal receiver 14 may be disposed on such as, but not limited to a head mounted device (HMD) worn by a user. The location of the positioning signal receiver 14 is variable according to the movement of the user.

The synchronizing module 12 can be disposed in any location of the room and is configured to communicate with the positioning signal transmitters 10A, 10B and 100 and the positioning signal receiver 14. More specifically, in an embodiment, the synchronizing module 12 informs the positioning signal receiver 14 the locations of the positioning signal transmitters 10A, 10B and 10C and further synchronizes the timing of the positioning signal transmitters 10A, 10B and 100 and the positioning signal receiver 14. The positioning signal receiver 14 further determines the location of itself according to signal transmissions between each of the positioning signal transmitters 10A, 10B and 100 and the positioning signal receiver 14.

The detail of the operation of the positioning system 1 is further described in the following paragraphs.

In FIG. 1, three positioning signal transmitters 10A, 10B and 10C exemplarily illustrated. In other embodiments, the number of the positioning signal transmitters can be different depending on practical application. The positioning signal transmitters 10A, 10B and 10C are configured to generate mechanical wave signals 11A, 11B and 11C.

In an embodiment, each of the mechanical wave signals 11A, 11B and 11C can be such as, but not limited to a sound signal or an ultrasound signal.

The synchronizing module 12 is configured to generate first electromagnetic wave signals 131A-131C for indicating positions of the positioning signal transmitters 10A, 10B and 10C respectively. In an embodiment, the synchronizing module 12 may include a radio frequency (RF) transmission circuit and each of the electromagnetic wave signals 131A-131C can be such as, but not limited to a RF signal.

For example, in an embodiment, identification codes of the positioning signal transmitters 10A, 10B and 100 are PST1, PST2 and PST3, and the coordinates of the positioning signal transmitters 10A, 10B and 10C relative to the room where the positioning system 1 locates are C1, C2 and C3. The first electromagnetic wave signals 131A-131C may include the information in the form of such as, but not limited to (PST1, C1), (PST2, C2) and (PST3, C3) to indicate the positions of the positioning signal transmitters 10A, 10B and 10C.

The synchronizing module 12 is further configured to generate second electromagnetic wave signals 133A-133C for respectively triggering the positioning signal transmitters 10A, 10B and 10C to generate the mechanical wave signals 11A, 11B and 11C.

The positioning signal receiver 14 includes an electromagnetic wave receiver 140 (abbreviated as EWR in FIG. 1), a mechanical wave receiver 142 (abbreviated as MWR in FIG. 1) and a processing circuit 144. The processing circuit 144 is electrically coupled to the electromagnetic wave receiver 140 and the mechanical wave receiver 142 and is able to communicate with the electromagnetic wave receiver 140 and the mechanical wave receiver 142.

The electromagnetic wave receiver 140 is configured to receive the first electromagnetic wave signals 131A-131C from the synchronizing module 12. The processing circuit 144 is configured to determine the positions of the positioning signal transmitters 10A, 10B and 10C according to the information in the first electromagnetic wave signals 131A-131C.

The electromagnetic wave receiver 140 is further configured to receive the second electromagnetic wave signals 133A-133C from the synchronizing module 12. Since the second electromagnetic wave signals 133A-133C are for triggering the positioning signal transmitters 10A, 10B and 10C to generate the mechanical wave signals 11A, 11B and 11C, the arrival time of the second electromagnetic wave signals 133A-133C is substantially equivalent to the delivery time of the mechanical wave signals 11A, 11B and 11C. It is appreciated that the term "substantially" means that the arrival time of the second electromagnetic wave signals 133A-133O and the delivery time of the mechanical wave signals 11A, 11B and 11C are not necessarily the same and may have a tolerable difference therebetween.

As a result, the processing circuit 144 can determine the delivery time of the mechanical wave signals 11A, 11B and 11O according to the arrival time of the second electromagnetic wave signals 133A-133O.

The mechanical wave receiver 142 is configured to receive the mechanical wave signals 11A, 11B and 11C from the positioning signal transmitters 10A, 10B and 10C. As a result, the processing circuit 144 can determine the arrival time of the mechanical wave signals 11A, 11B and 11O.

The processing circuit 144 is further configured to determine signal transmission times of the mechanical wave signals 11A, 11B and 11O according to arrival times of the second electromagnetic wave signals 133A-133C and the arrival times of the mechanical wave signals 11A, 11B and 11O.

The processing circuit 144 is configured to determine distances each between one of the positioning signal transmitters 10A, 10B and 10C and the positioning signal receiver 14 according to the signal transmission times.

The processing circuit 144 is further configured to determine a position of the positioning signal receiver 14 according to the distances and the positions of the positioning signal transmitters 10A, 10B and 10C. More specifically, based on the distances and the positions of the positioning signal transmitters 10A, 10B and 10C, the processing circuit 144 is configured to use the measurement method such as, but not limited to time of flight (ToF).

As a result, the positioning system 1 in the present invention can synchronize the positioning signal transmitters 10A, 10B and 10O and the positioning signal receiver 14 by using the synchronizing module 12. Further, based on the positions of the positioning signal transmitters 10A, 10B and 10O, the positioning signal receiver 14 can further determines the position of itself according to the mechanical wave signals 11A, 11B and 11O transmitted by the positioning signal transmitters 10A, 10B and 10C.

It is appreciated that the number of the positioning signal receiver 14 in the positioning system 1 illustrated in FIG. 1 is merely an example. In other embodiments, the positioning system 1 may include more than one positioning signal receivers and each of the positioning signal receivers can be operated to determine the position thereof by using the method described above.

In an embodiment, each of the mechanical wave signals 11A, 11B and 11O includes identification information to identify the corresponding positioning signal transmitters 10A, 10B and 10O. The processing circuit 144 is further configured to identify the mechanical wave signals 11A, 11B and 11O according to the identification information.

In an embodiment, the identification information includes frequencies of the mechanical wave signals 11A, 11B and 11O each corresponding to one of the positioning signal transmitters 10A, 10B and 10O.

For example, the frequencies of the mechanical wave signals 11A, 11B and 11C can be a first frequency, a second frequency and a third frequency that correspond to the positioning signal transmitters 10A, 10B and 10C respectively. As a result, when the mechanical wave receiver 142 receives a mechanical wave signal having the first frequency, the processing circuit 144 identifies that such a mechanical wave signal corresponds to the positioning signal transmitter 10A.

In another embodiment, the identification information includes delivery times of the mechanical wave signals 11A, 11B and 11O each corresponding to one of the positioning signal transmitters 10A, 10B and 10C.

For example, the mechanical wave signals 11A, 11B and 11O can be delivered at the timings having the same periodic length such that the delivery times are separated at a first time spot, a second time spot and a third time spot to correspond to the positioning signal transmitters 10A, 10B and 10O respectively. As a result, when the mechanical wave receiver 142 receives a mechanical wave signal having the delivery time at the second time spot, the processing circuit 144 identifies that such a mechanical wave signal corresponds to the positioning signal transmitter 10B.

In yet another embodiment, the identification information includes identification codes each corresponding to one of the positioning signal transmitters 10A, 10B and 10C.

For example, the mechanical wave signals 11A, 11B and 11C may include a first identification code, a second identification code and a third identification code that correspond to the positioning signal transmitters 10A, 10B and 10C respectively. As a result, when the mechanical wave receiver 142 receives a mechanical wave signal having the third identification code, the processing circuit 144 identifies that such a mechanical wave signal corresponds to the positioning signal transmitter 10C.

It is appreciated that the identification information described above is merely an example. In other embodiments, the mechanical wave signals 11A, 11B and 11C may include different combinations of the identification information described above or may include other kinds of identification information.

By employing the identification information, the processing circuit 144 is able to identify the mechanical wave signals 11A, 11B and 11C from the respective positioning signal transmitters 10A, 10B and 10C. Take the identification information including different frequencies as an example, the processing circuit 144 can identify the mechanical wave signals 11A, 11B and 11C even when the mechanical wave signals 11A, 11B and 11C are simultaneously delivered.

Figure 2:
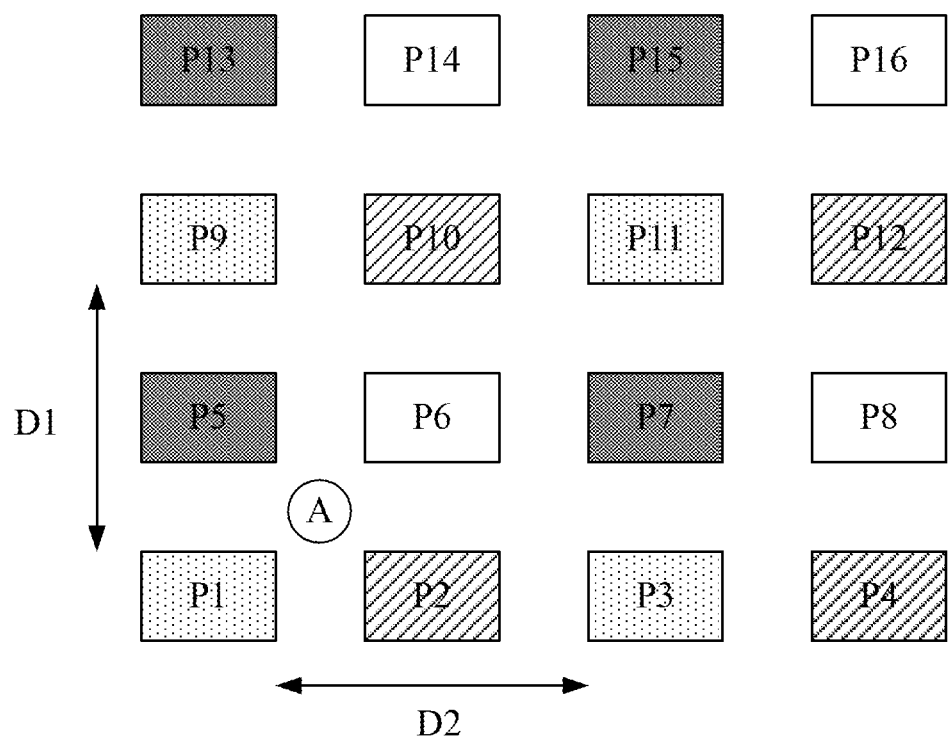
FIG. 2 is a diagram of sixteen positioning signal transmitters in an embodiment of the present invention.

Reference is now made to FIG. 2. FIG. 2 is a diagram of sixteen positioning signal transmitters P1-P16 in an embodiment of the present invention.

In an embodiment, a positioning system may include many positioning signal transmitters, such as the sixteen positioning signal transmitters P1-P16 in FIG. 2, such that the identification information is not sufficient to identify the positioning signal transmitters.

Under such a condition, the positioning signal transmitters P1-P16 can be categorized into a plurality of transmitter groups. As illustrated in FIG. 2, the positioning signal transmitters P1-P16 are categorized into four transmitter groups. Moreover, the mechanical wave signals generated by the positioning signal transmitters in each one of the transmitter groups share the same identification information.

In FIG. 2, the positioning signal transmitters P1, P3, P9 and P11 are within a first transmitter group illustrated as blocks with dotted pattern and the mechanical wave signals generated thereby share the same identification information.

The positioning signal transmitters P2, P4, P10 and P12 are within a second transmitter group illustrated as blocks with diagonal lines and the mechanical wave signals generated thereby share the same identification information.

The positioning signal transmitters P5, P7, P13 and P15 are within a third transmitter group illustrated as gray blocks and the mechanical wave signals generated thereby share the same identification information.

The positioning signal transmitters P6, P8, P14 and P16 are within a fourth transmitter group illustrated as blank blocks and the mechanical wave signals generated thereby share the same identification information.

For each of transmitter groups, a transmitter distance between each two of the positioning signal transmitters is larger than a predetermined value. For example, for the first transmitter group, the transmitter distance between the positioning signal transmitters P1 and P9 is D1, and the transmitter distance between the positioning signal transmitters P1 and P3 is D2. Both D1 and D2 should be larger than the predetermined value.

In an embodiment, a positioning signal receiver, e.g. the positioning signal receiver 14 illustrated in FIG. 1 is disposed within the area covered by the positioning signal transmitters P1-P16. The processing circuit 144 in the positioning signal receiver 14 can determine whether the intensity of the received mechanical wave signals is larger than a threshold.

When the intensity is not larger than the threshold, the processing circuit 144 determines that the positioning signal transmitter corresponding to such a mechanical wave signal is too far from the positioning signal receiver 14 and determines that such a mechanical wave signal is invalid.

For example, when a positioning signal receiver is disposed at spot A in FIG. 2 and receives the mechanical wave signals from the positioning signal transmitters P1, P3, P9 and P11 of the first transmitter group, the positioning signal receiver may determine that the intensity of the mechanical wave signal from the positioning signal transmitter P1 is larger than the threshold and the intensities of the mechanical wave signals from the positioning signal transmitters P3, P9 and P11 are not larger than the threshold.

Under such a condition, the positioning signal receiver determines that only the mechanical wave signal from the positioning signal transmitter P1 is valid and only uses the mechanical wave signal from the positioning signal transmitter P1 to determine the position of itself.

Figure 3:
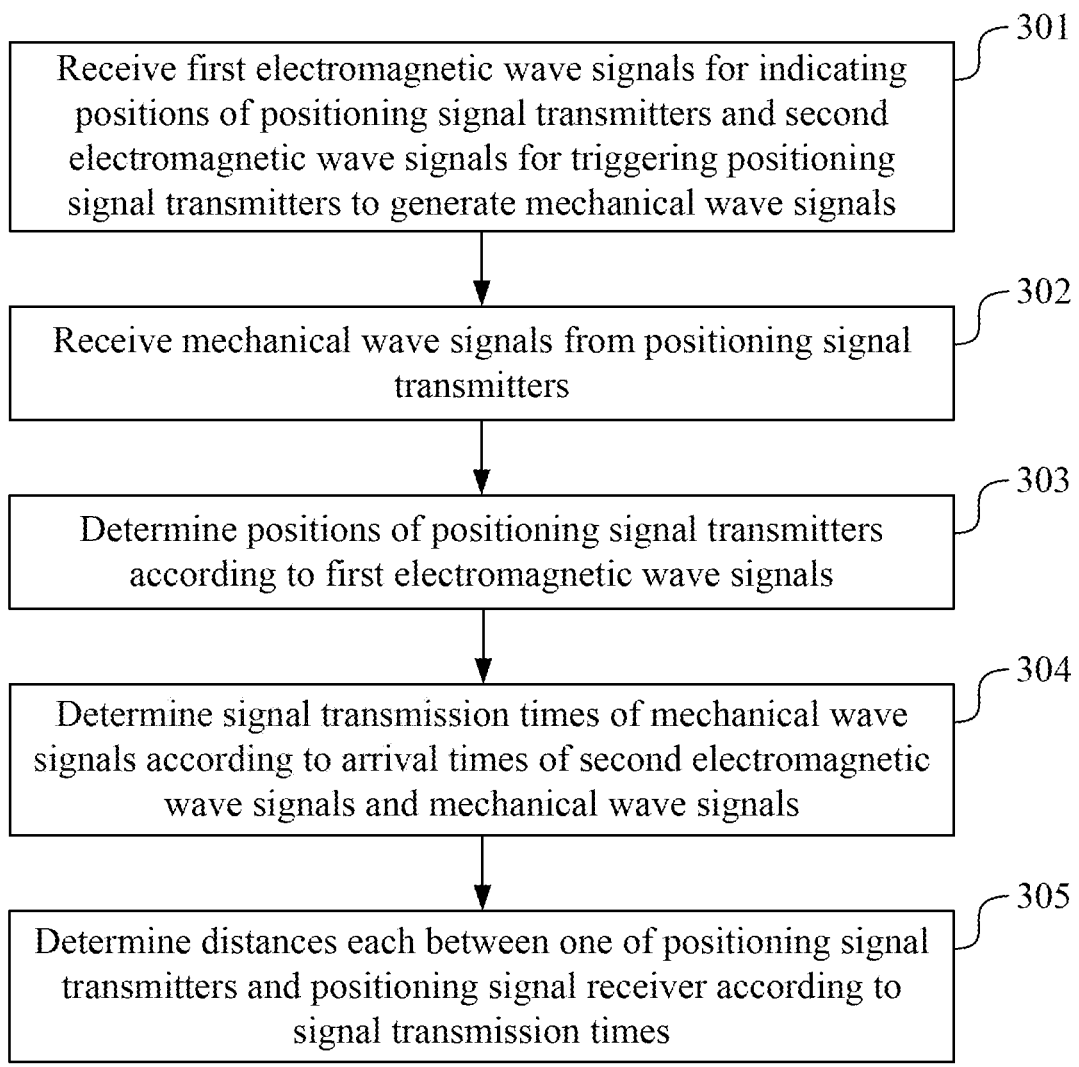
FIG. 3 is a flow chart of a positioning method in an embodiment of the present disclosure.

Reference is now made to FIG. 3. FIG. 3 is a flow chart of a positioning method 300 in an embodiment of the present disclosure. The positioning method 300 can be used in, for example, the positioning signal receiver 14 illustrated in FIG. 1, but the present disclosure is not limited thereto. The positioning method 300 includes the steps outlined below (The steps are not necessarily recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the first electromagnetic wave signals 131A-131C for indicating positions of the positioning signal transmitters 10A, 10B and 10C and the second electromagnetic wave signals 133A-133C for triggering the positioning signal transmitters 10A, 10B and 10C to generate mechanical wave signals 11A, 11B and 11C are received by the electromagnetic wave receiver 140.

In step 302, the mechanical wave signals 11A, 11B and 11C are received from the positioning signal transmitters 10A, 10B and 10C by the mechanical wave receiver 142.

In step 303, the positions of the positioning signal transmitters 10A, 10B and 10C are determined according to the first electromagnetic wave signals 131A-131C by the processing circuit 144.

In step 304, the signal transmission times of the mechanical wave signals 11A, 11B and 11C are determined according to the arrival times of the second electromagnetic wave signals 133A-133C and the mechanical wave signals 11A, 11B and 11C by the processing circuit 144 of the positioning signal receiver 14.

In step 305, the distances each between one of the positioning signal transmitters 10A, 10B and 10C and the positioning signal receiver 14 are determined according to the signal transmission times by the processing circuit 14.

In step 306, the position of the positioning signal receiver 14 is determined according to the distances and the positions of the positioning signal transmitters 10A, 10B and 10C by the processing circuit 144.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A positioning signal receiver comprising:
   an electromagnetic wave receiver, configured to receive from a synchronizing module first electromagnetic wave signals for indicating positions of a plurality of positioning signal transmitters and second electromagnetic wave signals for triggering the positioning signal transmitters to generate mechanical wave signals;
   a mechanical wave receiver, configured to receive the mechanical wave signals from the positioning signal transmitters; and
   a processing circuit, coupled to the electromagnetic wave receiver and the mechanical wave receiver, and configured to determine the positions of the positioning signal transmitters according to the first electromagnetic wave signals,
   determine signal transmission times of the mechanical wave signals according to arrival times of the second electromagnetic wave signals and the mechanical wave signals, and
   determine distances each between one of the positioning signal transmitters and the positioning signal receiver according to the signal transmission times;
   wherein the processing circuit determines a position of the positioning signal receiver according to the distances and the positions of the positioning signal transmitters, wherein each of the mechanical wave signals comprises identification information to identify the corresponding positioning signal transmitters;
wherein the processing circuit is further configured to identify the mechanical wave signals according to the identification information,
wherein the identification information comprises frequencies of the mechanical wave signals each corresponding to one of the positioning signal transmitters,
wherein the positioning signal receiver is positioned on a user located in a room, the positioning signal transmitters are disposed in the room, and the synchronizing module is disposed in the room, wherein the mechanical wave signals are simultaneously delivered, and
wherein, when the mechanical wave signals are not simultaneously delivered, the identification information further comprises delivery times of the mechanical wave signals which are separated by the processing circuit for different time spots of equal periodic length corresponding to different one of the plurality of positioning signal transmitters.

2. The positioning signal receiver of claim 1, wherein the identification information comprises identification codes each corresponding to one of the positioning signal transmitters.

3. The positioning signal receiver of claim 1, wherein the positioning signal transmitters are categorized into a plurality of transmitter groups such that the mechanical wave signals generated by the positioning signal transmitters in each one of the transmitter groups share the same identification information, wherein a transmitter distance between each two of the positioning signal transmitters within the same one of the transmitter groups is larger than a predetermined value.

4. A positioning system comprising:
a plurality of positioning signal transmitters configured to generate mechanical wave signals for a mechanical wave receiver;
a synchronizing module configured to generate first electromagnetic wave signals for indicating positions of the positioning signal transmitters and second electromagnetic wave signals for triggering the positioning signal transmitters to generate the mechanical wave signals; and
a positioning signal receiver comprising: an electromagnetic wave receiver, configured to receive the first and the second electromagnetic wave signals from the synchronizing module;
the mechanical wave receiver, configured to receive the mechanical wave signals from the positioning signal transmitters; and
a processing circuit, coupled to the electromagnetic wave receiver and the mechanical wave receiver, and
configured to determine the positions of the positioning signal transmitters according to the first electromagnetic wave signals,
determine signal transmission times of the mechanical wave signals according to arrival times of the second electromagnetic wave signals and the mechanical wave signals, and
determine distances each between one of the positioning signal transmitters and the positioning signal receiver according to the signal transmission times;
wherein the processing circuit determines a position of the positioning signal receiver according to the distances and the positions of the positioning signal transmitters,
wherein each of the mechanical wave signals comprises identification information to identify the corresponding positioning signal transmitters;
wherein the processing circuit is further configured to identify the mechanical wave signals according to the identification information,
wherein the identification information comprises frequencies of the mechanical wave signals each corresponding to one of the positioning signal transmitters,
wherein the positioning signal receiver is positioned on a user located in a room, the positioning signal transmitters are disposed in the room, and the synchronizing module is disposed in the room, wherein the mechanical wave signals are simultaneously delivered;
wherein, when the mechanical wave signals are not simultaneously delivered, the identification information further comprises delivery times of the mechanical wave signals which are separated by the processing circuit for different time spots of equal periodic length corresponding to different one of the plurality of positioning signal transmitters.

5. The positioning system of claim 4, wherein the identification information comprises identification codes each corresponding to one of the positioning signal transmitters.

6. The positioning system of claim 4, wherein the positioning signal transmitters are categorized into a plurality of transmitter groups such that the mechanical wave signals generated by the positioning signal transmitters in each one of the transmitter groups share the same identification information, wherein a transmitter distance between each two of the positioning signal transmitters within the same one of the transmitter groups is larger than a predetermined value.

7. A positioning method used in a positioning signal receiver comprising:
receiving first electromagnetic wave signals for indicating positions of a plurality of positioning signal transmitters and second electromagnetic wave signals for triggering the positioning signal transmitters to generate mechanical wave signals by an electromagnetic wave receiver comprised in the positioning signal receiver;
receiving the first and the second electromagnetic wave signals from a synchronizing module by the electromagnetic wave receiver;
receiving the mechanical wave signals from the positioning signal transmitters by a mechanical wave receiver comprised in the positioning signal receiver;
determining the positions of the positioning signal transmitters according to the first electromagnetic wave signals by a processing circuit coupled to the electromagnetic wave receiver and the mechanical wave receiver;
determining signal transmission times of the mechanical wave signals according to arrival times of the second electromagnetic wave signals and the mechanical wave signals by the processing circuit;
determining distances each between one of the positioning signal transmitters and the positioning signal receiver according to the signal transmission times by the processing circuit; and
determining a position of the positioning signal receiver according to the distances and the positions of the positioning signal transmitters by the processing circuit,
wherein each of the mechanical wave signals comprises identification information to identify the corresponding positioning signal transmitters, and the positioning method further comprises: identifying the mechanical wave signals according to the identification information by the processing circuit, wherein the identification information comprises frequencies of the mechanical wave signals each corresponding to one of the positioning signal transmitters, wherein the positioning signal receiver is positioned on a user located in a room, the positioning signal transmitters are disposed in the room, and the synchronizing module is disposed in the room, wherein the mechanical wave signals are simultaneously delivered;

wherein, when the mechanical wave signals are not simultaneously delivered, the identification information further comprises delivery times of the mechanical wave signals which are separated by the processing circuit for different time spots of equal periodic length corresponding to different one of the plurality of positioning signal transmitters.

8. The positioning method of claim 7, wherein the identification information comprises identification codes each corresponding to one of the positioning signal transmitters.

9. The positioning method of claim 7, wherein the positioning signal transmitters are categorized into a plurality of transmitter groups such that the mechanical wave signals generated by the positioning signal transmitters in each one of the transmitter groups share the same identification information, wherein a transmitter distance between each two of the positioning signal transmitters within the same one of the transmitter groups is larger than a predetermined value.

\* \* \* \* \*